(12) United States Patent
Chang et al.

(10) Patent No.: US 9,525,332 B2
(45) Date of Patent: Dec. 20, 2016

(54) ELECTRIC GENERATING DEVICE HAVING REDUCED VOLUME

(71) Applicant: Ya Ling Chang, Hsinchu (TW)

(72) Inventors: Ya Ling Chang, Hsinchu (TW); Chin Te Chang, Hsinchu (TW)

(73) Assignee: Ya Ling Chang, Sinfon Hsiang, Hsinchu (TW)

( * ) Notice: Subject to any disclaimer, the term of this patent is extended or adjusted under 35 U.S.C. 154(b) by 275 days.

(21) Appl. No.: 14/487,133

(22) Filed: Sep. 16, 2014

(65) Prior Publication Data

US 2016/0079842 A1 Mar. 17, 2016

(51) Int. Cl.
*H02K 7/02* (2006.01)
*H02K 53/00* (2006.01)
*H02K 7/116* (2006.01)

(52) U.S. Cl.
CPC .............. *H02K 53/00* (2013.01); *H02K 7/025* (2013.01); *H02K 7/116* (2013.01); *Y10S 74/09* (2013.01)

(58) Field of Classification Search
CPC .......... H02K 7/025; H02K 7/02; H02K 7/116; Y10S 74/09
USPC ...... 310/74, 75 R, 83, 96, 98, 99; 74/DIG. 9
See application file for complete search history.

(56) References Cited

U.S. PATENT DOCUMENTS

| | | | |
|---|---|---|---|
| 4,354,448 A | 10/1982 | Lin | |
| 4,423,794 A * | 1/1984 | Beck | B60K 6/105 180/165 |
| 4,688,419 A * | 8/1987 | D'Angelo | G01L 3/16 73/116.06 |
| 4,768,607 A * | 9/1988 | Molina | F02B 73/00 180/165 |
| 4,928,553 A * | 5/1990 | Wagner | F16H 33/02 475/267 |
| 5,434,454 A * | 7/1995 | Farkas | H02J 9/066 290/1 R |
| 5,689,174 A * | 11/1997 | Pacheco, Sr. | B60K 6/26 180/65.1 |
| 6,690,141 B1 | 2/2004 | Yu | |
| 7,108,095 B1 | 9/2006 | Washington et al. | |
| 2002/0189398 A1 | 12/2002 | Mu et al. | |
| 2010/0171381 A1 | 7/2010 | Ling | |
| 2011/0156513 A1* | 6/2011 | Froelich | H02K 53/00 310/74 |
| 2014/0319947 A1* | 10/2014 | Anderson | H02K 53/00 310/74 |

* cited by examiner

*Primary Examiner* — Thanh Lam
(74) *Attorney, Agent, or Firm* — Charles E. Baxley

(57) ABSTRACT

An electric generating device includes a motor having a rotary member, an electric generating mechanism having an engaging member, and a transmission device includes a primary gearing mechanism having a follower attached to a primary shaft and engaged with the rotary member of the motor, and another follower engaged with the engaging member of the electric generating mechanism for allowing the engaging member of the electric generating mechanism to be driven by the motor, and a secondary gearing mechanism includes another follower attached to a secondary shaft and engaged with the primary gearing mechanism for being driven by the primary gearing mechanism.

11 Claims, 6 Drawing Sheets

ELECTRIC GENERATING DEVICE HAVING
REDUCED VOLUME

BACKGROUND OF THE INVENTION

1. Field of the Invention

The present invention relates to an electric generating device, and more particularly to an electric generating device including a decreased space or volume for allowing the electric generating device to be easily disposed or installed in a relatively tiny place or the like.

2. Description of the Prior Art

Typical electric generating devices comprise an electric generator or generating mechanism for generating the electricity or the electric energy or power, and normally, an electric motor or a manual driving or actuating mechanism is further provided and coupled to the electric generator or generating mechanism for actuating or operating the electric generator or generating mechanism to generate the electricity or the electric energy or power.

For example, U.S. Pat. No. 4,354,448 to Lin, U.S. Pat. No. 6,690,141 to Yu, U.S. Pat. No. 7,108,095 to Washington et al., U.S. Patent Application Publication No. 2002/0189398 to Mu et al., and U.S. Patent Application Publication No. 2010/0171381 to Ling disclose several of the typical electric generating devices each comprising a transmission gearing mechanism connected or coupled between an electric generator or generating mechanism and a motor or a manual driving or actuating mechanism for generating electricity or the like.

However, the electric generators or generating mechanisms includes a great volume that may not be easily disposed or installed in a relatively tiny place or the like.

The present invention has arisen to mitigate and/or obviate the afore-described disadvantages of the conventional electric generating devices.

SUMMARY OF THE INVENTION

The primary objective of the present invention is to provide an electric generating device including a decreased space or volume for allowing the electric generating device to be easily disposed or installed in a relatively tiny place or the like.

In accordance with one aspect of the invention, there is provided an electric generating device comprising a power driving device including a motor having a spindle, and a rotary member attached to the spindle, an electric generating mechanism including a pivot axle, and an engaging member attached to the pivot axle, and a transmission device including a primary gearing mechanism having a primary shaft, and a first flywheel (W) attached to the primary shaft, a first follower attached to the primary shaft and engaged with the rotary member of the motor, a second follower attached to the primary shaft and engaged with the engaging member of the electric generating mechanism for allowing the engaging member of the electric generating mechanism to be driven by the motor, and at least one secondary gearing mechanism having a secondary shaft, a second flywheel (W) attached to the secondary shaft, and a third follower attached to the secondary shaft and engaged with the primary gearing mechanism. The followers of the primary gearing mechanism are disposed beside the first flywheel (W), or the first flywheel (W) and the followers are disposed side by side, and the engaging member of the electric generating mechanism is aligned and engaged with the second follower of the primary gearing mechanism, and the follower of the secondary gearing mechanism is aligned and engaged with the second follower of the primary gearing mechanism, and the follower of the secondary gearing mechanism is aligned and engaged with the first follower of the primary gearing mechanism such that the transmission device may include a greatly reduced or decreased space or volume that is excellent for being disposed or installed in a relatively tiny place or the like.

The rotary member is attached to the spindle with a unidirectional bearing member. The first flywheel (W) is attached to the primary shaft with a unidirectional bearing member. The second flywheel (W) is attached to the secondary shaft with a unidirectional bearing member.

The third follower of the secondary gearing mechanism is engaged with the first follower of the primary gearing mechanism; or the third follower of the secondary gearing mechanism is engaged with the second follower of the primary gearing mechanism.

The power driving device includes a driver electrically connected to the motor. The power driving device includes a power source electrically connected to the driver. The electric generating mechanism is electrically connected to the power source with a charging device.

A load may further be provided and electrically connected to the electric generating mechanism. The first flywheel (W) includes a first notch and at least one second notch formed therein for engaging with a first magnetic member and at least one second magnetic member.

The rotary member of the motor is selected from a pinion for engaging with the first follower of the primary gearing mechanism which is selected from a gear. The engaging member of the electric generating mechanism is selected from a gear for engaging with the second follower of the primary gearing mechanism which is selected from a pinion.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
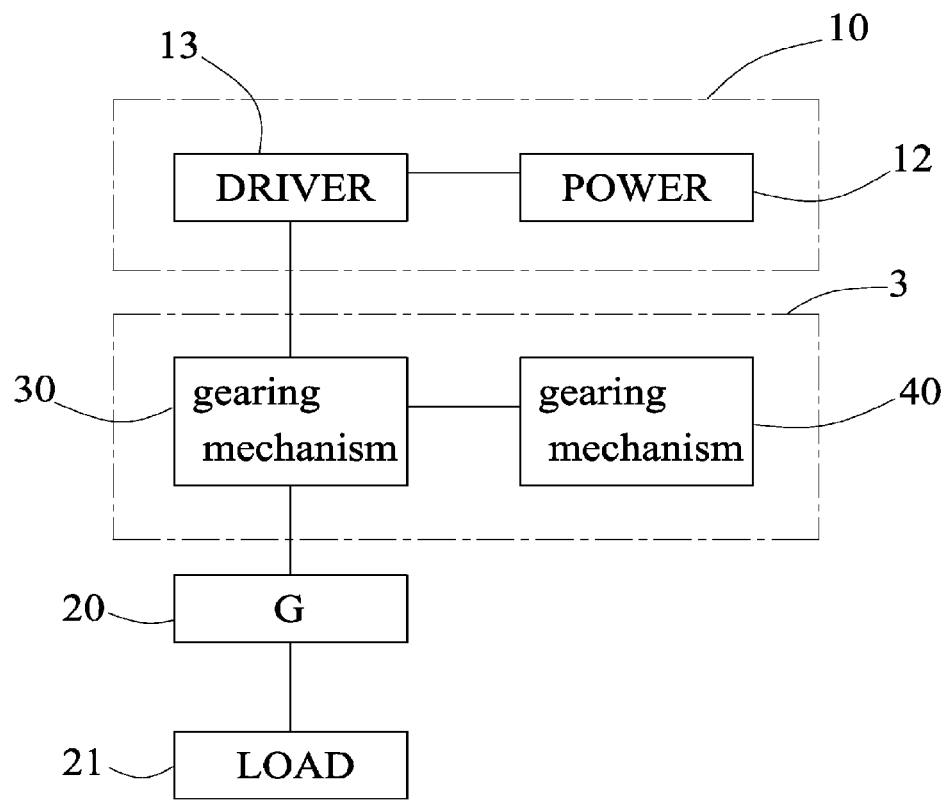
FIG. 1 is a block diagram illustrating the parts or elements of an electric generating device in accordance with the present invention.
Figure 2:
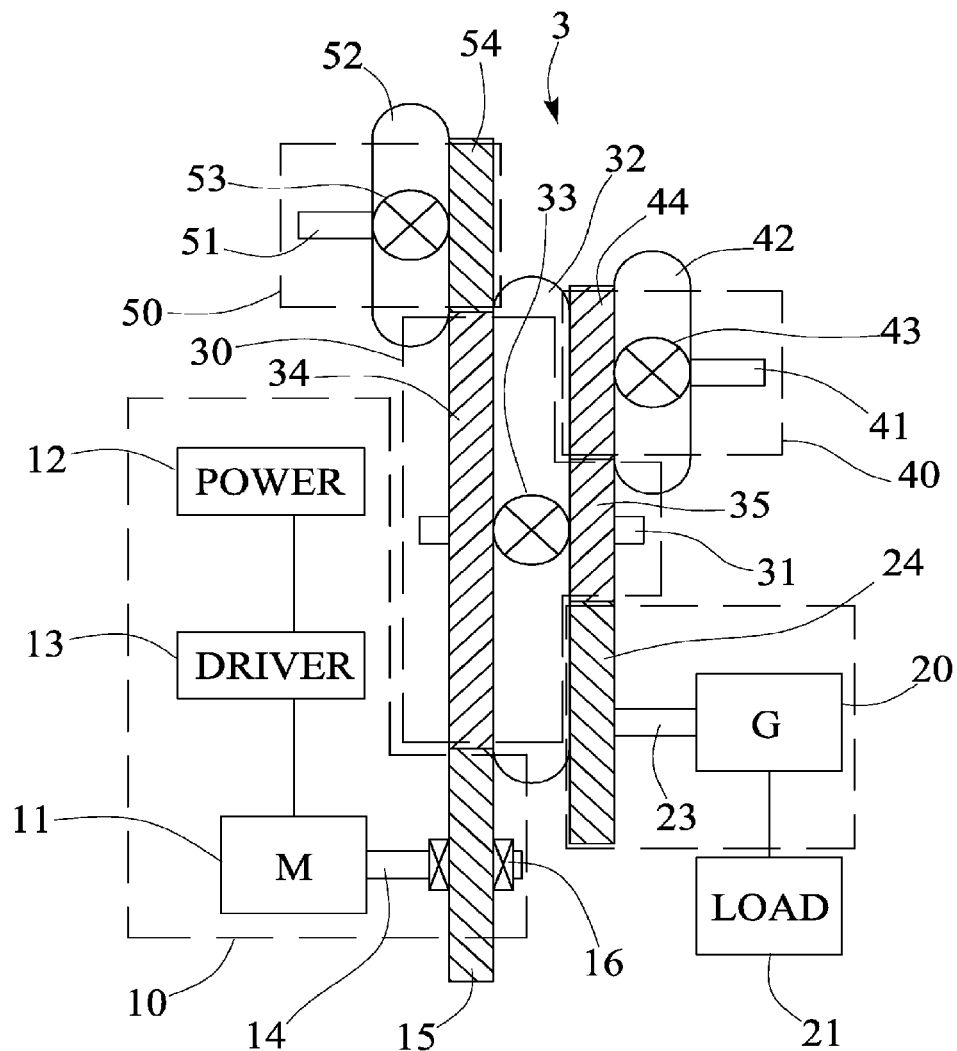
FIG. 2 is another block diagram or schematic view illustrating the parts or elements of the electric generating device.

Referring to the drawings, and initially to FIGS. 1 and 2, an electric generating device in accordance with the present invention comprises a power driving device 10 including a motor 11 directly or indirectly and electrically connected or coupled to an electric reservoir or battery or power source 12 with a driving or actuating mechanism or driver 13, and an electric generator or generating mechanism 20 to be connected or coupled to the motor 11 of the power driving device 10 and to be actuated or operated to generate the electricity or the electric energy or power, and a transmission gearing mechanism or transmission device 3 is further be provided and connected or coupled between the power driving device 10 and the electric generating mechanism 20 for suitably increasing the driving speed of the electric generating mechanism 20 and for suitably increasing the electricity generating effect or efficiency thereof.

The motor 11 of the power driving device 10 includes a spindle 14, and an engaging or rotary member 15, such as a pinion 15 attached or mounted or secured to the spindle 14 with a bearing member 16, such as a unidirectional bearing member 16 for allowing the rotary member or pinion 15 to be pivoted or rotated relative to the spindle 14 unidirectionally, in which the rotary member or pinion 15 is provided for engaging with or connecting or coupling to the transmission device 3, and the electric generating mechanism 20 includes a pivot axle 23, and another rotary or engaging member 24, such as a gear 24 attached or mounted or secured to the pivot axle 23 for engaging with or connecting or coupling to the transmission device 3, the electric generating mechanism 20 may be directly or indirectly and electrically connected or coupled to a load 21 for energizing or driving or actuating or operating the load 21 which may be selected from any electric apparatuses or facilities.

The transmission device 3 includes a first or primary gearing mechanism 30 and one or more (such as two) secondary or auxiliary gearing mechanisms 40, 50, in which the first or primary gearing mechanism 30 includes a first or primary shaft 31, and an idle wheel or flywheel (W) 32 disposed or attached or mounted or secured onto the shaft 31 with a bearing member 33, such as a unidirectional bearing member 33 for allowing the flywheel (W) 32 to be pivoted or rotated relative to the shaft 31 unidirectionally, and the secondary or auxiliary gearing mechanisms 40, 50 each include a secondary or auxiliary shaft 41, 51, and an idle wheel or flywheel (W) 42, 52 disposed or attached or mounted or secured onto the secondary or auxiliary shaft 41, 51 with a bearing member 43, 53, such as a unidirectional bearing member 43, 53 for allowing the flywheel (W) 42, 52 to be pivoted or rotated relative to the shaft 41, 51 unidirectionally.

The first or primary gearing mechanism 30 further includes first and second engaging members or followers 34, 35, such as a gear 34 and a pinion 35 disposed or attached or mounted or secured onto the primary shaft 31 and meshed or engaged with the rotary member or pinion 15 of the motor 11 and the engaging member or gear 24 of the electric generating mechanism 20 respectively for allowing the engaging member or gear 24 of the electric generating mechanism 20 to be pivoted or rotated or driven by the motor 11. The secondary or auxiliary gearing mechanisms 40, 50 each include another engaging member or follower 44, 54, such as a gear or pinion 44, 54 disposed or attached or mounted or secured onto the secondary or auxiliary shaft 41, 51 respectively and meshed or engaged with the follower 35, 34 respectively for allowing the followers 44, 54 of the secondary or auxiliary gearing mechanisms 40, 50 to be pivoted or rotated or driven by the follower 35, 34 of the first or primary gearing mechanism 30 respectively, and for suitably increasing or maintaining or determining the driving speed of the electric generating mechanism 20.

Figure 3:
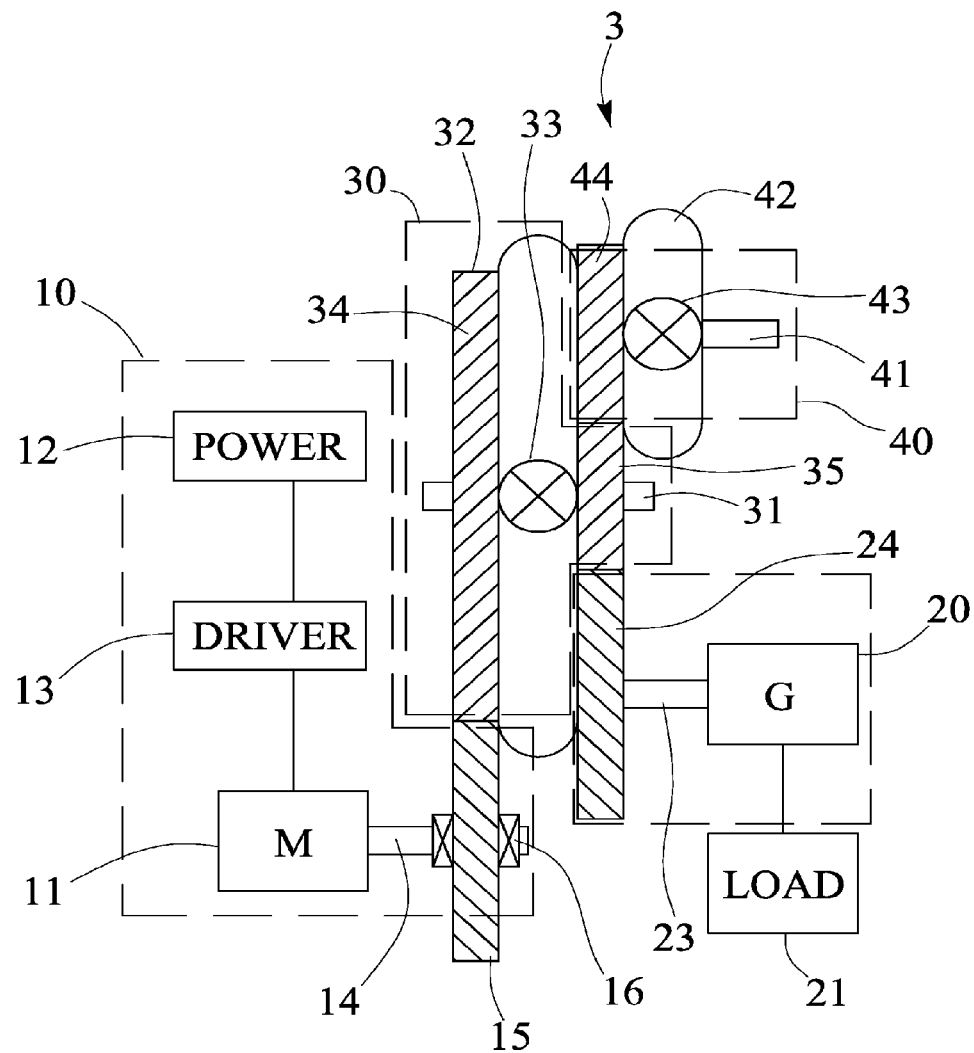
FIG. 3 is a further block diagram similar to FIG. 2, illustrating the other arrangement of the electric generating device.
Figure 4:
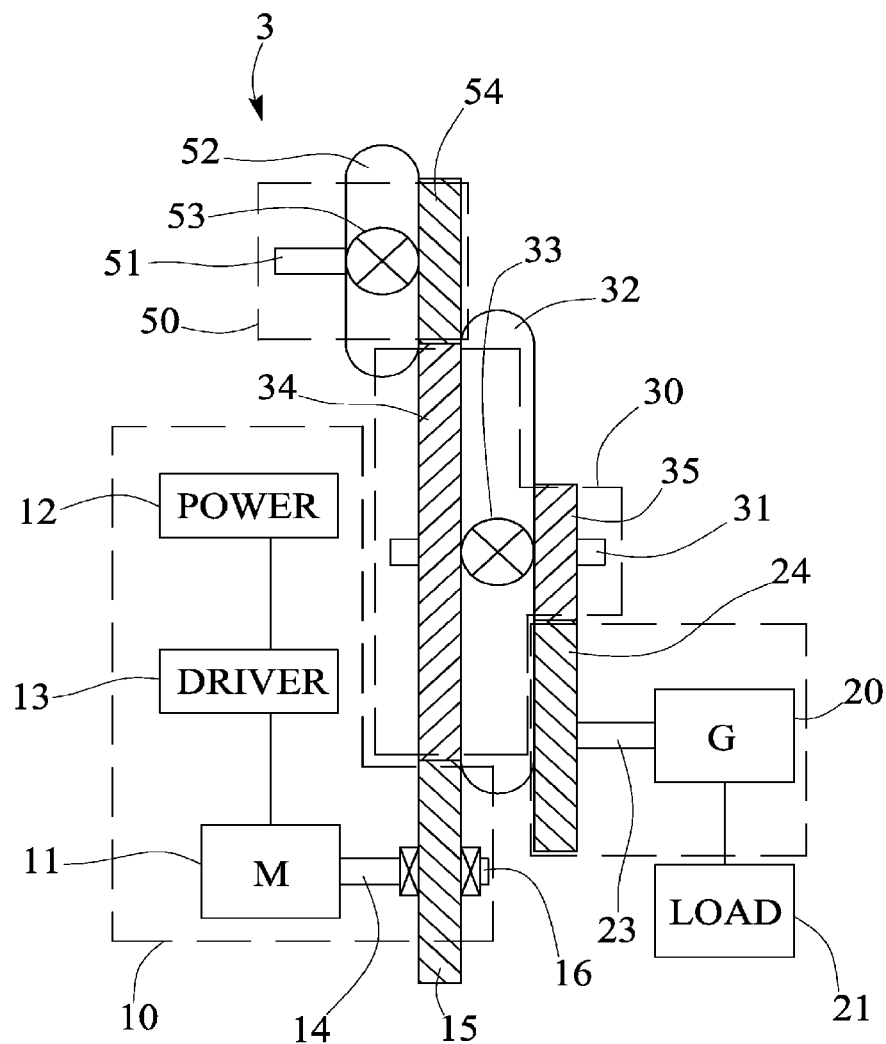
FIG. 4 is a still further block diagram similar to FIGS. 2 and 3, illustrating the further arrangement of the electric generating device.
Figure 5:
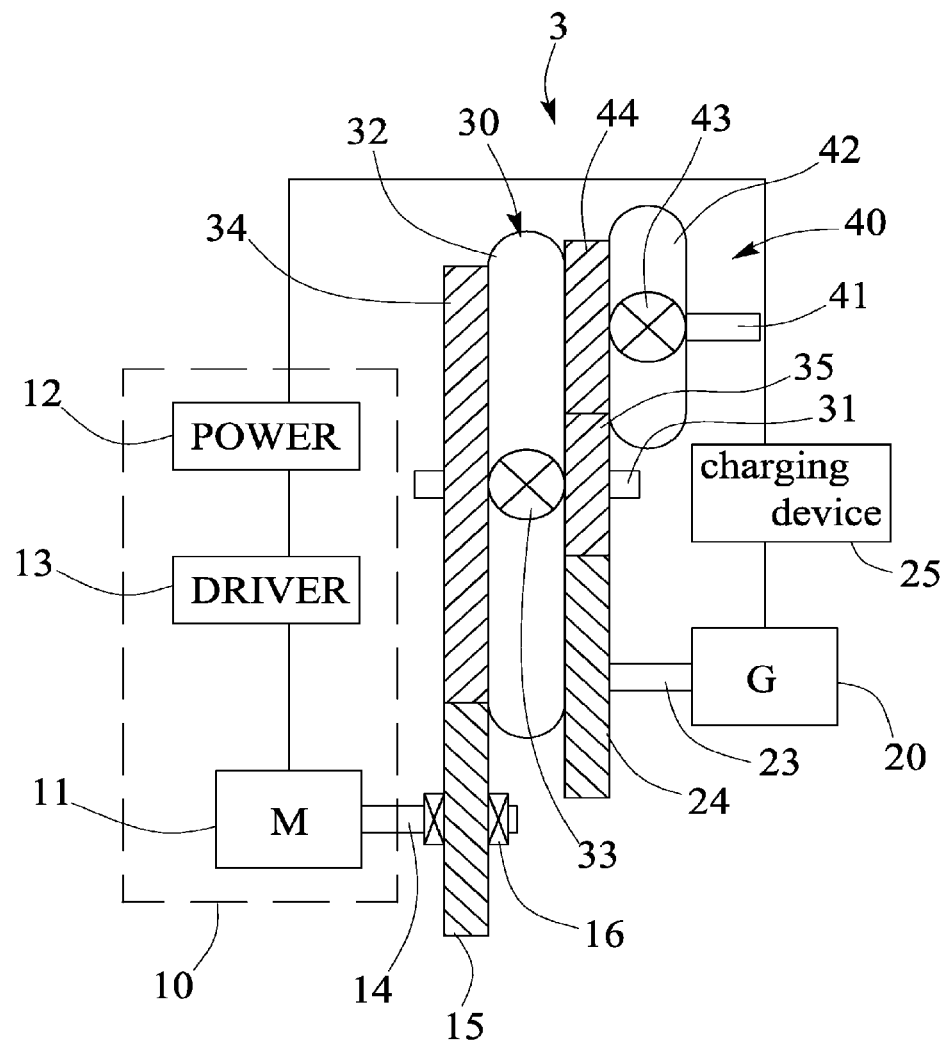
FIG. 5 is a still further block diagram similar to FIGS. 2-4, illustrating the still further arrangement of the electric generating device.

Alternatively, as shown in FIG. 3, the transmission device 3 may include only one secondary or auxiliary gearing mechanism 40 having a follower 44 meshed or engaged with the follower 35 of the first or primary gearing mechanism 30 for being rotated or driven by the follower 35 of the first or primary gearing mechanism 30; or alternatively, as shown in FIG. 4, the transmission device 3 may include only one secondary or auxiliary gearing mechanism 50 having a follower 54 meshed or engaged with the follower 34 of the first or primary gearing mechanism 30 for being rotated or driven by the follower 34 of the first or primary gearing mechanism 30. As shown in FIG. 5, the electric generating mechanism 20 may further include a charging device 25 electrically connecting or coupling to the electric reservoir or battery or power source 12 of the power driving device 10 for allowing the electricity or the electric energy generated by the electric generating mechanism 20 to be stored in the electric reservoir or battery or power source 12 of the power driving device 10.

Figure 6:
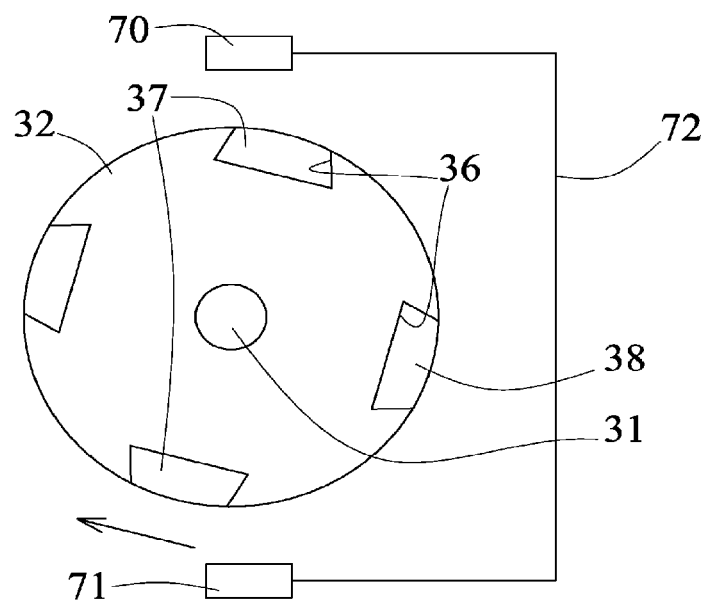
FIG. 6 is a partial plan schematic view illustrating a portion of the electric generating device.
Figure 7:
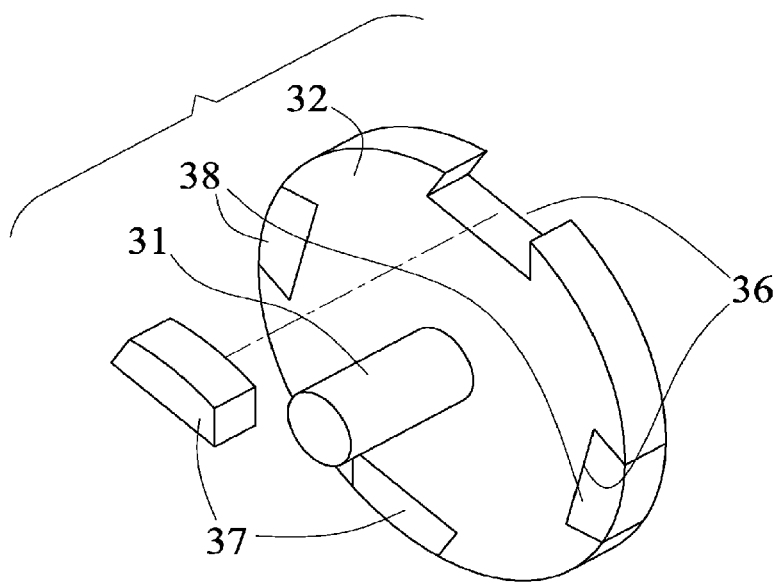
FIG. 7 is a partial exploded view of the electric generating device.

As shown in FIGS. 6 and 7, the flywheel (W) 32 of the first or primary gearing mechanism 30 may include one or more (such as four) notches 36 formed in the outer peripheral portion thereof and preferably equally spaced from each other for receiving or engaging with magnets or magnetic materials or members 37, 38 respectively, in which the magnetic members 37 are negative or positive poles and preferably disposed or arranged opposite to each other, and the other magnetic members 38 are positive or negative poles different from that of the magnetic members 37 and also preferably disposed or arranged opposite to each other and disposed or arranged beside or between the magnetic members 37 respectively, or the magnetic members 37, 38 are disposed or arranged alternatively. The electric generating device in accordance with the present invention further includes one or more (such as two) stationary magnets or magnetic materials or elements 70, 71 disposed or arranged beside the flywheel (W) 32 of the first or primary gearing mechanism 30 and supported on or with a supporting device 72 for acting with the magnetic members 37, 38 of the flywheel (W) 32 and for providing an auxiliary driving power or energy to the flywheel (W) 32 of the first or primary gearing mechanism 30.

As shown in FIGS. 2-5, the followers 34, 35 of the first or primary gearing mechanism 30 are closely disposed or arranged beside the flywheel (W) 32, or the flywheel (W) 32 and the followers 34, 35 are disposed side by side, and the engaging member or gear 24 of the electric generating mechanism 20 is aligned or in line with and meshed or engaged with the second follower 35 of the first or primary gearing mechanism 30, and the follower 44 of the secondary or auxiliary gearing mechanism 40 is aligned or in line with and meshed or engaged with the second follower 35 of the first or primary gearing mechanism 30 (FIGS. 2, 3, 5), and as shown in FIGS. 2 and 4, the follower 54 of the secondary or auxiliary gearing mechanism 50 is aligned or in line with and meshed or engaged with the first follower 34 of the first or primary gearing mechanism 30, such that the transmission device 3 may include a greatly reduced or decreased space or volume that is excellent for being disposed or installed in a relatively tiny place or the like.

Accordingly, the electric generating device in accordance with the present invention includes a decreased space or volume for allowing the electric generating device to be easily disposed or installed in a relatively tiny place or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An electric generating device comprising:
    a power driving device including a motor having a spindle, and a rotary member attached to said spindle,
    an electric generating mechanism including a pivot axle, and an engaging member attached to said pivot axle, and
    a transmission device including:
        a primary gearing mechanism having a primary shaft, and a first flywheel (W) attached to said primary shaft, a first follower attached to said primary shaft and engaged with said rotary member of said motor, a second follower attached to said primary shaft and engaged with said engaging member of said electric generating mechanism for allowing said engaging member of said electric generating mechanism to be driven by said motor, and
        at least one secondary gearing mechanism having a secondary shaft, a second flywheel (W) attached to said secondary shaft, and a third follower attached to said secondary shaft and engaged with said primary gearing mechanism.

2. The electric generating device as claimed in claim 1, wherein said rotary member is attached to said spindle with a unidirectional bearing member.

3. The electric generating device as claimed in claim 1, wherein said first flywheel (W) is attached to said primary shaft with a unidirectional bearing member.

4. The electric generating device as claimed in claim 1, wherein said second flywheel (W) is attached to said secondary shaft with a unidirectional bearing member.

5. The electric generating device as claimed in claim 1, wherein said third follower of said at least one secondary gearing mechanism is engaged with said first follower of said primary gearing mechanism.

6. The electric generating device as claimed in claim 1, wherein said third follower of said at least one secondary gearing mechanism is engaged with said second follower of said primary gearing mechanism.

7. The electric generating device as claimed in claim 1, wherein said power driving device includes a driver electrically connected to said motor.

8. The electric generating device as claimed in claim 7, wherein said power driving device includes a power source electrically connected to said driver.

9. The electric generating device as claimed in claim 8, wherein said electric generating mechanism is electrically connected to said power source with a charging device.

10. The electric generating device as claimed in claim 1 further comprising a load electrically connected to said electric generating mechanism.

11. The electric generating device as claimed in claim 1, wherein said first flywheel (W) includes a first notch and at least one second notch formed therein for engaging with a first magnetic member and at least one second magnetic member.

* * * * *